United States Patent
Thure et al.

(10) Patent No.: US 9,292,687 B2
(45) Date of Patent: Mar. 22, 2016

(54) DETECTING FILE ENCRYPTING MALWARE

(71) Applicant: F-Secure Corporation, Helsinki (FI)

(72) Inventors: Marko Thure, Helsinki (FI); Mikko Suominen, Helsinki (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 14/462,638

(22) Filed: Aug. 19, 2014

(65) Prior Publication Data

US 2015/0058987 A1    Feb. 26, 2015

(30) Foreign Application Priority Data

Aug. 22, 2013   (GB) .................................. 1315049.5

(51) Int. Cl.
    *G06F 21/55*    (2013.01)
(52) U.S. Cl.
    CPC ................... *G06F 21/554* (2013.01)
(58) Field of Classification Search
    CPC ... G06F 21/566; G06F 21/602; G06F 21/568; G06F 2221/034; G06F 21/554
    See application file for complete search history.

(56) References Cited

U.S. PATENT DOCUMENTS

| | | | |
|---|---|---|---|
| 8,352,522 B1 * | 1/2013 | Cheng | 707/827 |
| 2005/0223238 A1 * | 10/2005 | Schmid et al. | 713/188 |
| 2007/0152854 A1 * | 7/2007 | Copley | 341/51 |
| 2008/0005555 A1 * | 1/2008 | Lotem et al. | 713/150 |
| 2011/0296525 A1 * | 12/2011 | Turbin | 726/23 |
| 2012/0222120 A1 * | 8/2012 | Rim et al. | 726/24 |
| 2012/0297486 A1 * | 11/2012 | Turbin | 726/24 |
| 2013/0067576 A1 * | 3/2013 | Niemela | 726/24 |
| 2013/0086683 A1 * | 4/2013 | Thomas et al. | 726/24 |
| 2013/0160125 A1 * | 6/2013 | Likhachev et al. | 726/24 |
| 2014/0007228 A1 * | 1/2014 | Ngair | 726/22 |

FOREIGN PATENT DOCUMENTS

| | | |
|---|---|---|
| EP | 1 679 631 A2 | 7/2006 |
| EP | 2 570 955 A1 | 3/2013 |

* cited by examiner

*Primary Examiner* — Chau Le
(74) *Attorney, Agent, or Firm* — Harrington & Smith

(57) ABSTRACT

A method in a computer for detecting a file encryption attack. The computer detects an attempt to overwrite current file data of a file with new file data. The computer then compares the new file data to the current file data to obtain a measure of the difference between the current and the new file data, and if the difference exceeds a threshold, the computer considers this to identify a file encryption attack.

16 Claims, 2 Drawing Sheets

---

S101 Detect an attempt to overwrite current file data with new file data

S102 Compare the new file data to the current file data to obtain a measure of the difference between the current and the new file data S103 If said difference exceeds a threshold, identifying a file encryption attack S104 Response (e.g. prevent attempt, log attempt, terminate process)

DETECTING FILE ENCRYPTING MALWARE

FIELD OF THE INVENTION

The present invention relates to a method and a computer for detecting file encrypting malware.

BACKGROUND

File encrypting malware (also known as ransomware, "crypters", or cryptoviral extortion) is a class of malware which restricts a user's access to files on their system by encrypting the files. Generally, such malware will demand that the user pays to have their files decrypted. Recovery from file encrypting malware is difficult, as decrypting the files requires obtaining the decryption key for the encryption. In some cases, this may be recovered from the file encrypting malware itself. However, newer file encrypting malware programs often use asymmetrical encryption, or a random encryption key which is sent to a remote server after encryption and is not stored locally, making recovery of the key impossible. The encryption algorithms are generally strong enough to prevent decryption without obtaining the key.

File encrypting malware is a particular problem for business users, as the malware may encrypt files both on the local machine, and on any accessible network drives, causing costly disruptions. Current methods of detecting file encrypting malware are substantially the same as those for detecting other malware, e.g. using known signatures, or heuristic analysis of malware-containing files.

SUMMARY

According to a first aspect, there is provided a method in a computer for detecting a file encryption attack attempting to encrypt file data. The computer detects an attempt to overwrite current file data of a file with new file data. The computer then compares the new file data to the current file data to obtain a measure of the difference between the current and the new file data, and if the difference exceeds a threshold, the computer considers this to identify a file encryption attack attempting to encrypt the current file data, and performs a response to the identified file encryption attack.

The step of comparing the new file data to the current file data may comprise calculating a first entropy value for the new file data, calculating a second entropy value for the current file data, and comparing the first and second entropy values.

Additionally, or alternatively, the step of comparing the new file data to the current file data may comprise comparing the size of the new file data and/or the current file data to the size of the file; determining whether the new file data contains bytes that are not allowed for a filetype of the file; and/or determining the number of bits which would be changed by the attempt to write new data.

The response may comprise any of:
preventing the attempt to overwrite existing file data;
reverting the attempt to overwrite existing file data;
terminating a program, process, service or thread which performed the attempt to overwrite existing file data;
notifying the user
sending a notification to a remote server.

According to a second aspect, there is provided a computer comprising a file system monitor, a data comparator, and an attack response processor. The file system monitor is for detecting an attempt to overwrite current file data of a file with new file data. The data comparator is for comparing the new file data to the current file data to obtain a measure of the difference between the current and the new file data. The attack response processor is for identifying a file encryption attack attempting to encrypt current file data if said difference exceeds a threshold, and for performing a response to the file encryption attack.

According to a further aspect, there is provided a computer program for causing a computer to perform the method of the first aspect.

DETAILED DESCRIPTION

Figure 1:
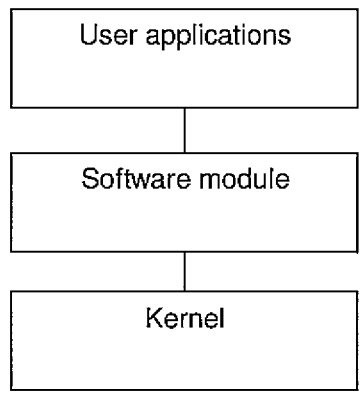
FIG. 1 illustrates the Location of a software module according to an embodiment.

A method is described here to detect file encrypting malware by monitoring file writing operations requested by applications on a computer system, without the use of traditional anti-malware measures or reliance on previous knowledge of the malware. In order to effectively detect the file encryption malware, and to prevent it from modifying existing files, the operation of the malware must be identified and blocked before the file operations are performed. Therefore, there is described here a software module which is logically located (as shown in FIG. 1) between user applications and the software kernel which controls the disk device (e.g. a file system filter driver on a Windows™ system, the Linux Kernel Module on a Linux™ system, or the Kauth subsystem on a Mac OS X™ system). The software module may also be located in the software kernel. The software module monitors file operations performed by the user applications, and identifies malicious operations from operation sequences, operation types, and properties of the data handled in the operations.

Figure 2:
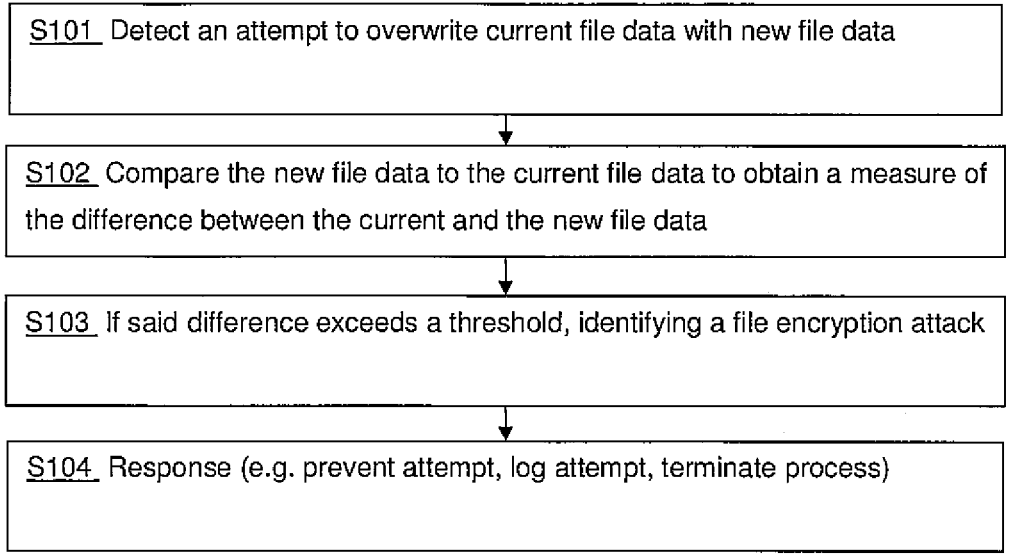
FIG. 2 is a flowchart of a method according to an embodiment.
Figure 3:
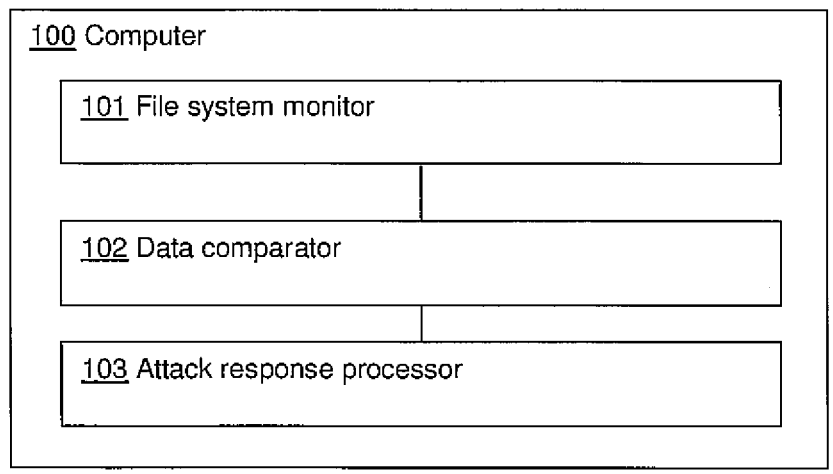
FIG. 3 is a Nock diagram of a computer according to an embodiment.

The method performed by the software module is illustrated in FIG. 2. The software module may be implemented as a number of separate modules within the computer, as shown in FIG. 3. The file system monitor 101 detects an attempt to overwrite current file data with new file data S101. The data comparator 102 then compares the new file data to the current file data to obtain a measure of the difference between the current and the new file data S102. If this difference exceeds a threshold, the attack response processor 103 then identifies a file encryption attack S103 and may then respond to this identification S104 (e.g. by preventing the encryption, flagging the encrypting program as malware, or terminating the encrypting program). When an attack is identified, the user may be notified, and the user may be prompted to authorise the response.

The measure of the difference between the current and the new file data is a measure of the likelihood that the modification is an attempt to encrypt the current file data. Various possibilities for such a measure are described below, and the skilled person will appreciate that other implementations of the measure are possible.

In one embodiment, when a user application attempts to overwrite an already existing data file, the software module determines the entropy of the data to be written, and the entropy of the data to be replaced. If the entropy of the data to be written is much higher than that of the existing data, the software module will consider the action as possibly that of file encryption malware. The software module may then take action, which may comprise notifying the user, requesting that the user confirm the operation, preventing the file modification operation, and/or terminating the process or thread which requested the file modification.

An example of calculation of entropy is the calculation of the Shannon entropy of the file, which is a measure of how well the file could be compressed without data loss, given an ideal compression scheme. The Shannon entropy therefore measures the degree of disorder in the file, and is higher for random data (and most encrypted data), and lower for ordinary data, since most normal files will have some degree of order or repetition.

Figure 4:
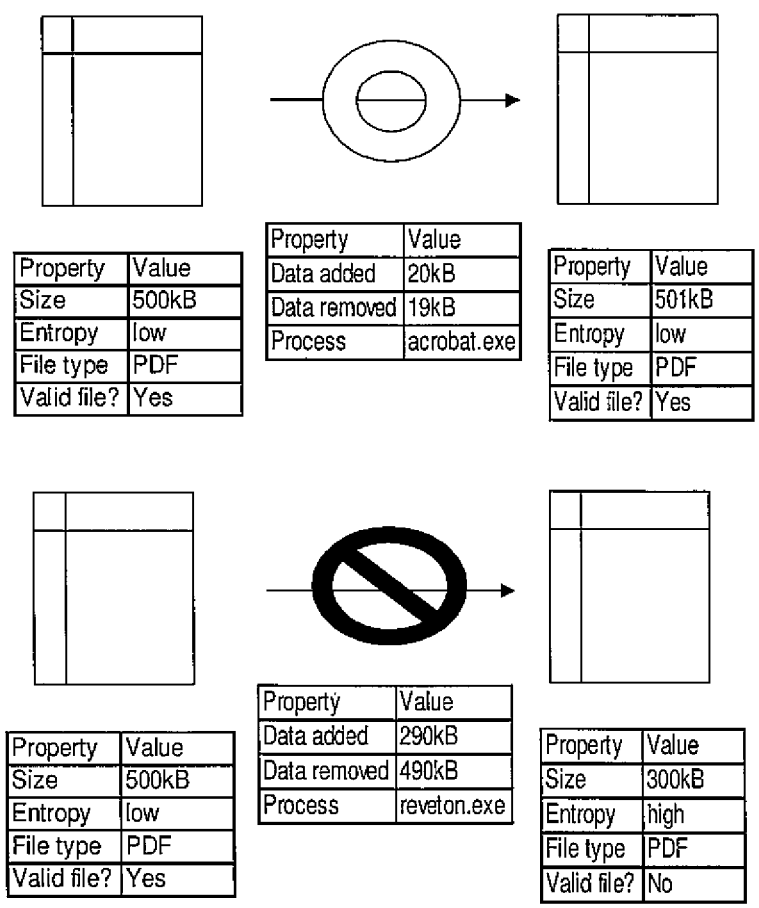
FIG. 4 illustrates file modification operations performed by legitimate and malicious programs.

In a further embodiment, the software module may (alternatively or in addition to the above) check the number of bytes that would be changed by the file modification. This may be done by examining the size of the portion of the original file to be modified, or the size of the new data to be written to the file. Alternatively, this may be done by comparing the old file and the new file bit-by-bit (or byte-by-byte), and determining the number of bits (or bytes) that have changed. This would allow comparison for high-entropy data (e.g. data that is already encrypted or compressed). Other methods that can identify an attempt to encrypt data by comparing the result of a file modification request to the existing file can also be used. For example, certain file types always begin with certain byte sequences (e.g. a PDF file always begins with % PDF). If a change to a file would modify these byte sequences, then this may be a sign that the file is being encrypted. Another example would be if content in a file is being replaced with bytes that are not allowed, or very uncommon for that file type. Most file types will have byte patterns that are not allowed, or restricted in use for that filetype. An example of such a change would be a text file being modified to contain bytes that do not correspond to any valid character, or a large number of bytes that correspond to unusual symbols. FIG. 4 shows an example of a legitimate file modification (top), and a file modification which encrypts the file (bottom).

The software module may be activated only for certain file types (e.g. PDF documents and Word documents) which are generally targeted by file encryption malware. Additionally, the software module may be configured to ignore file operations by programs which routinely perform benign encryption (e.g. WinZip™, TrueCrypt™), or which routinely modify such files (e.g. Microsoft Word™, Adobe Acrobat™). These programs may be added to a whitelist, which may be modified by updates (e.g. if a vulnerability is found in one of the programs which new malware could exploit, it is removed from the whitelist). It may also be possible for the user to add a program to the whitelist in response to the software module detecting a suspicious file modification.

File encryption malware typically encrypts numerous files in quick succession; therefore the software module may only take action against suspected malware after a number of suspicious file modifications. This may be implemented by setting a certain threshold number of modifications (which may be time dependent, e.g. no more than N modifications in T seconds). In this case, the action may include "rolling back" the overwritten files, replacing them with the versions before the suspicious file modifications took place. This may require storing the modifications in a cache.

An example will now be given of an implementation in a Windows™ computer system. The skilled person will readily appreciate how the disclosure could be modified to other architectures. This implementation will use features described as optional above, and this should not be taken to indicate that these features are essential to the invention.

The necessary functionality is implemented by creating the software module as a part of a Windows file system filter driver. The driver implements the PostCreate and PreWrite callback routines. PostCreate is called by the operating system after a user application has either opened either an existing file or a new file. PreWrite is called by the operating system after a user application initiates a file writing operation, but before the completion of the operation.

When PostCreate is called, the software module determines the type of the file object being opened, the program opening the file object, and whether it is a new file or an existing file. If the file object is not of a monitored type, is opened by a program on the whitelist, or is a new file, then operations to the file are not monitored (i.e. future PreWrite calls for that file are ignored). Otherwise, the software module creates a context for later observation, recording (e.g.) the identity of the file object, and the program or thread which opened the file. When the program attempts to write to the file, PreWrite is called. The software module determines whether the file that is the target of the write operation has an existing context. If a context is present, the software module determines the location in the file which the program wishes to modify, reads the original data from the target file at that location to a read buffer, and compares the data in the read buffer to the data in the write buffer that is to be written to the file. If the write is suspicious (e.g. due to the amount of data being changed, or the change in entropy), then the write operation is prevented.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method in a computer for detecting a file encryption attack attempting to encrypt file data, the method comprising:
    detecting, by a computing device, an attempt to overwrite existing file data of a file with new file data;
    calculating, by the computing device, a difference in entropy between the new file data and the existing file data, wherein the calculating the difference in entropy comprises calculating a measure of how well the existing file and the new file data could be compressed without data loss given a pre-determined compression scheme;
    using, by the computing device, said difference in entropy to identify a file encryption attack;
    performing, by the computing device, a response to the identified file encryption attack, wherein the response comprises at least one of:
    preventing the attempt to overwrite the existing file data;
    reverting the attempt to overwrite the existing file data;
    terminating a program, process, service or thread which performed the attempt to overwrite the existing file data; and
    notifying the user and sending a notification to a remote server of the identified attack.

2. The method according to claim 1, comprising:
    prompting the user to authorise performing the response.

3. The method according to claim 1, comprising:
identifying the attempt to overwrite the existing file data as non-malicious if a program, process, service or thread which performed the attempt to overwrite the existing file data is included on a whitelist.

4. The method according to claim 3, comprising:
prompting the user to add a program, process, service or thread which performed the attempt to overwrite the existing file data to the whitelist.

5. The method according to claim 1, comprising:
identifying the attempt to overwrite the existing file data as non-malicious if a file type of the file is not a target file type.

6. The method according to claim 1, comprising:
incrementing a count of a number of modifications for a program, process, service or thread which performed the attempt to overwrite the existing file data.

7. The method according to claim 6, comprising:
determining that the count of the number of modifications for the program, process, service or thread exceeds a threshold value; and
performing a response comprising at least one of:
terminating the program, process, service or thread;
reverting all file operations performed by the program, process, service or thread;
preventing the attempt to overwrite the existing file data;
notifying the user.

8. The method according to claim 1, wherein said detecting is performed by a software module logically located between applications of the computer and a software kernel of the computer, or within the software kernel.

9. A computer comprising:
a file system monitor, configured with one or more processors, for detecting an attempt to overwrite existing file data of a file with new file data;
a data comparator, configured with the one or more processors, for calculating a difference in entropy between the new file data and the existing file data, wherein the calculating the difference in entropy comprises calculating a measure of how well the existing file and the new file data could be compressed without data loss given a pre-determined compression scheme; and
an attack response processor configured for using said difference in entropy to identify a file encryption attack and for performing a response to the identified file encryption attack, wherein the response comprises at least one of:
preventing the attempt to overwrite the existing file data;
reverting the attempt to overwrite the existing file data;
terminating a program, process, service or thread which performed the attempt
to overwrite the existing file data; and
notifying the user of the attack.

10. The computer according to claim 9, wherein the attack response processor is configured to prompt the user to authorise performing the response.

11. The computer according to claim 9, comprising a memory for storing a whitelist of programs, processes, services or threads, and a whitelist module for identifying the attempt to overwrite the existing file data as non-malicious if a program, process, service or thread which performed the attempt to overwrite the existing file data is included on the whitelist.

12. The computer according to claim 11, wherein the whitelist module is configured to add the program, process, service or thread which performed the attempt to overwrite the existing file data to the whitelist in response to user input.

13. The computer according to claim 9, comprising a program context module configured to, in response to identifying the file encryption attack, increment a count of a number of modifications for the program, process, service or thread which performed the attempt to overwrite the existing file data.

14. The computer according to claim 13, wherein the program context module is additionally configured to:
determine that the count of the number of modifications for the program,
process, service, or thread exceeds a threshold value; and
the attack response processor is configured to perform a response comprising at least one of:
terminating the program, process, service or thread;
reverting all file operations performed by the program, process, service or thread; preventing the attempt to overwrite the existing file data;
notifying the user.

15. The computer according to claim 9, wherein the file system monitor comprises a software module logically located between applications of the computer and a software kernel of the computer, or within the software kernel.

16. A device comprising a computer program for causing the device to perform a method for detecting a file encryption attack attempting to encrypt file data, the method comprising:
detecting an attempt to overwrite existing file data of a file with new file data;
calculating a difference in entropy between the new file data and the existing file data, wherein the calculating the difference in entropy comprises calculating a measure of how well the existing file and the new file data could be compressed without data loss given a pre-determined compression scheme;
using said difference in entropy to identify a file encryption attack; and performing, by the computing device, a response to the identified file encryption attack, wherein the response comprises at least one of:
preventing the attempt to overwrite the existing file data;
reverting the attempt to overwrite the existing file data;
terminating a program, process, service or thread which performed the
attempt to overwrite the existing file data; and
notifying the user and sending a notification to a remote server of the identified attack.

* * * * *